United States Patent

[11] 3,589,659

| [72] | Inventor | Robert F. Larkin |
| | | West Haven, Conn. |
| [21] | Appl. No. | 20,716 |
| [22] | Filed | Mar. 18, 1970 |
| [45] | Patented | June 29, 1971 |
| [73] | Assignee | United Aircraft Corporation |
| | | East Hartford, Conn. |

[54] CLAMPING DEVICE
7 Claims, 3 Drawing Figs.

[52] U.S. Cl.................................. 248/228,
24/263, 248/316, 296/35
[51] Int. Cl............................................ B62d 23/00
[50] Field of Search.......................... 248/226,
226 B, 228, 229, 316, 72, 361; 24/263.3, 263.5;
296/35.1

[56] References Cited
UNITED STATES PATENTS
1,303,854  5/1919  Clark............................ 296/35 UX 3,111,912  11/1963  Keiter......................... 248/228 UX
FOREIGN PATENTS
674,555  6/1952  Great Britain............ 296/35

Primary Examiner—J. Franklin Foss
Attorneys—Maurice B. Tasker and Vernon F. Hauschild ABSTRACT: An equipment-supporting base adapted to be clamped to an elongated flanged beam has a hollow pad in the opposite sidewalls of which a hand-rotated shaft is journaled. The shaft has left-hand and right-hand threaded portions on opposite sides of the pad which carry threaded clamping members for engaging oppositely extending flanges on the beam. A spacer is fixed to the shaft within the hollow pad and the shaft carries compression springs between the spacer and the adjacent sidewalls of the pad which center the shaft and clamping member assembly relative to the pad prior to engagement of said clamping members with said flanges.

PATENTED JUN 29 1971

3,589,659

INVENTOR
ROBERT F. LARKIN
BY M B Tasker
ATTORNEY

CLAMPING DEVICE

BACKGROUND OF THE INVENTION

The clamping device of this invention is used to attach a frame to a maintenance trailer which has two spaced longitudinal rails, or I-beams, to which the clamping devices are attached. The frame, which carries a plurality of the clamping devices, may be a flat plate or it may have provisions, for example, for cradling a gas turbine engine which is to be serviced or any other device which it may be desired to transport. Usually four or more clamping devices are employed which are secured to the frame beneath and along the opposite sides of the latter directly over the I-beams of the trailer. Clamping devices of this general nature have been used before, but these have been found to be bulky, costly and to require the use of special tools to operate them.

SUMMARY OF THE INVENTION

It is a primary object of this invention to provide a clamping device of this general type which is easy to use, requires no tools, and is light in weight.

Another object of this invention is to provide a clamping device which is easy to position on the flanged beam to which it is attached with a minimum of effort.

A further object of this invention is to provide a spring-biased spacing device for a shaft-supporting pad between the clamping members which allows the shaft and clamp assembly to float to a limited extend relative to the pad to compensate for minor variations in the spacing of the flanges being gripped.

A yet further object of this invention is to improve clamping devices of this type.

DESCRIPTION OF THE PREFERRED EMBODIMENT

Figure 3:
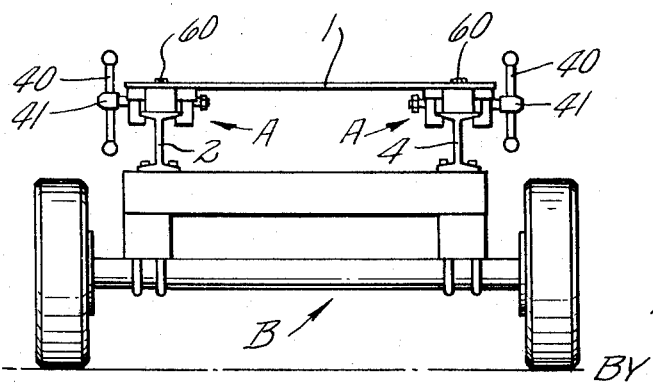
FIG. 3 is an end view of a maintenance trailer with a frame attached thereto in accordance with this invention, two clamping devices being shown.

The clamping device A of this invention, two of which are shown in use in FIG. 3, are used to attach a frame 1 to a maintenance trailer B which has longitudinally extended I-beams 2 and 4, one located on each side of the trailer. The frame may be provided with special provisions for supporting any piece of equipment which it is desired to transport, such as a gas turbine engine. To facilitate illustration the frame 1 is shown herein as a flat plate which provides a work surface.

The clamping devices A are located beneath the frame 1 to which they are secured in suitably spaced relation to lie directly over the I-beams 2 and 4 of the trailer.

Figure 1:
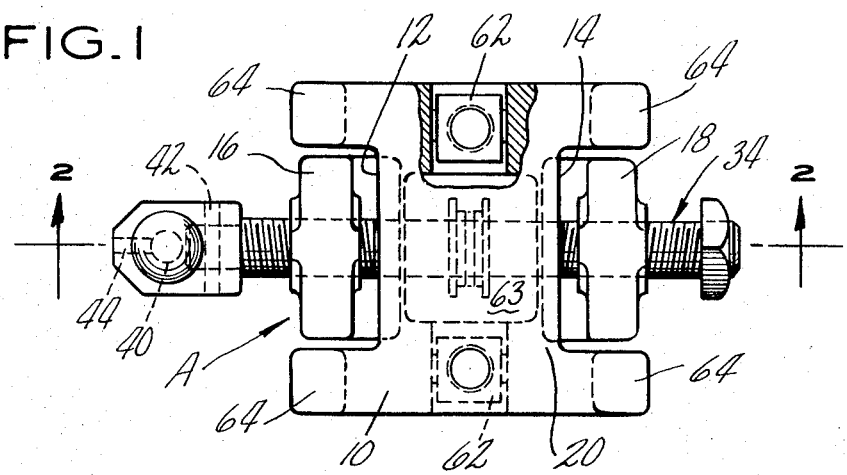
FIG. 1 is a plan view of a preferred embodiment of the clamping device of this invention.
Figure 2:
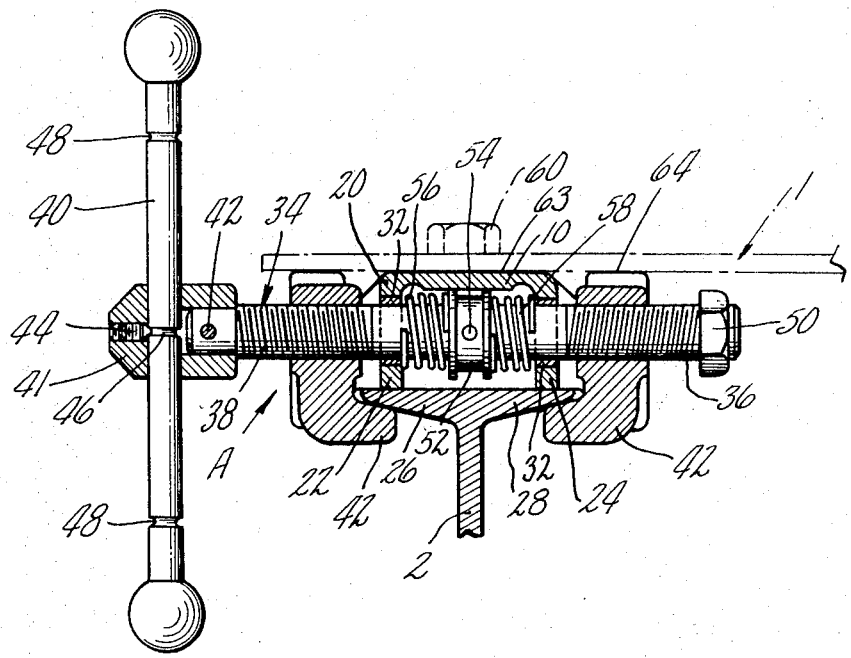
FIG. 2 is a section on line 2-2 of FIG. 1.

As shown in detail in FIGS. 1 and 2 of the drawing, the improved clamping device includes a generally rectangular pad assembly, or base, 10 which is deeply notched on two opposite sides to receive clamping members 16 and 18. Base 10 has a rectangular, hollow supporting portion 20 between notches 12 and 14, including depending sidewalls 22 and 24 (FIG. 2), which rest on top of flanges 26 and 28 of longitudinal I-beam 2 forming a structural part of the trailer. The hollow supporting portion 20 of base 10 has bearings 32 in its opposite depending sidewalls 22 and 24 in which a shaft 34 is journaled.

Shaft 34 has left-hand and right-hand threads 36 and 38 which engage corresponding threads in clamping members 18 and 16 so that, as the shaft is rotated in one direction by handle 40, the clamping members will move away from flanges 26 and 28, whereas rotation of the shaft in the opposite direction will move the clamping members toward the flanges and cause them to engage their hooked ends 42 beneath flanges 26 and 28 and clamp the pad assembly firmly to the beam.

Handle 40 is slidable through a hub 41 which is secured to shaft 34 by a pin 42. As shown the handle is positioned in the hub by means of a spring plunger 44 in the hub, the ball end of which is engageable with a groove 46 in the center of the handle or with one of similar grooves 48 adjacent the ends of the handle. A nut 50 is threaded onto the end of shaft 34 which serves as a stop to limit the separating movement of the clamping members.

A central spacer 52 is secured to shaft 34 by a pin 54 and compression springs 56 and 58 are provided on shaft 34, each of which engages the spacer at one end and abuts the adjacent sidewall of supporting portion 20 at its other end.

In operation, rotation of shaft 34 in the proper direction by handle 40 causes clamping members 16 and 18 to travel toward each other, gripping flanges 26 and 28 of I-beam 2 and clamping the pad firmly to the beam. Rotation of handle 40 in the opposite direction will cause separation of the clamping members and release of the pad assembly.

During this operation of the clamping device the central spacer 52 and its associated springs 56 and 58 allow the shaft and clamp assembly to float laterally relative to the pad assembly to a limited extent to compensate for minor variations in the spacing of the I-beams 2 and 4 being gripped. This limited freedom of movement of the shaft and clamp assembly is desirable because the pad assembly of each clamping device A is rigidly secured to the bottom surface of frame 1 by two bolts 60 which extend downwardly through the frame and are threaded into barrel nuts 62 (FIG. 1) mounted in pad 10. As the bolts are tightened the frame 1 is drawn against supporting base 10, engaging a central surface 63 and four corner pads 64 on said base which lie in the same plane as surface 63.

As a result of the above arrangement the clamping members of the several clamping devices A attached to the frame 1 are enable to float, not only to allow for variations in spacing between the generally parallel I-beams 2 and 4, but also to insure that equal clamping force is imparted to each clamping member.

I claim:

1. For use with a frame adapted to be temporarily attached to two parallel rails carried by and extended longitudinally of a maintenance vehicle at the opposite sides of the latter, two clamping devices fixed to the bottom of said frame at opposite sides thereof each in position to overlie a different rail, said clamping devices each including a supporting member fixed to the frame and a floating shaft and clamp assembly, said assembly including a shaft journaled in said member for both rotation and axial movement in a direction transverse to said rails having left and right-hand threaded portions on opposite sides of said member, and two clamping members, one on each side of said supporting member, having left and right-hand threads engaging with corresponding threads on said shaft, means for rotating said shaft in opposite directions to move said clamping members toward and away from each other, and means for limiting the aforesaid axial movement of the shaft and clamp assembly relative to said supporting member including abutment means on said shaft engageable with said supporting member.

2. The combination of claim 1 in which the supporting member has a hollow chamber through which the shaft extends and the abutment means on said shaft is located within said chamber and is engageable with the opposite walls thereof to limit the axial movement of the clamp assembly.

3. For use with a frame adapted to be temporarily attached to rails extended longitudinally of a maintenance trailer, a plurality of clamping devices fixed to the bottom of said frame each in position to overlie one of said rails, said clamping devices each including a supporting member, a shaft journaled in said member for rotation and axial movement in a direction transverse to said rails, said shaft having left- and right-hand threaded portions on opposite sides of said member, a clamping member on each side of said supporting member having left- and right-hand threads engaging with corresponding threads on said shaft, means for rotating said shaft in opposite directions to move said clamping members toward and away from each other, means for limiting axial movement of the shaft and clamping member assembly including abutment means on said shaft engageable with said supporting member, and compression springs located between said abutment means and said supporting member for normally centering said clamping members relative to said supporting member.

4. In a clamping device, a base assembly including a supporting member, a shaft journaled for rotation and axial sliding movement in said member, said shaft having left- and right-hand threaded portions on opposite sides of said member, a clamping member on each side of said supporting member having left- and right-hand threads engaging with corresponding threads on said shaft, means for rotating said shaft in opposite directions to move said clamping members toward and away from each other, and means for normally centering said clamping members relative to said supporting member including fixed abutment means on said shaft and resilient means acting in opposite directions between said abutment means and said supporting member.

5. The clamping device of claim 4 in which the supporting member is hollow and the abutment means and the resilient means are both carried by the shaft within the hollow supporting member.

6. In a clamping device, a base assembly including a hollow central supporting member, a shaft journaled for rotation and for axial movement in opposite sidewalls of said supporting member having left- and right-hand threaded portions on opposite sides of said supporting member, clamping members on said shaft on opposite sides of said supporting member having left- and right-hand threads meshing with corresponding threads on said shaft, means for rotating said shaft in opposite directions to move said clamping members toward each other to bring their confronting faces into clamping engagement with a member to which said assembly is to be attached and away from each other to release said clamping members, and resilient positioning means carried by said shaft within said hollow supporting member which normally centers the shaft and clamping member assembly relative to said supporting member and allows said shaft and clamping member assembly to float to a limited extent relative to said supporting member during clamping engagement of said clamping members.

7. The clamping device of claim 6 in which the resilient positioning means carried by the shaft includes a fixed abutment on said shaft located centrally in said hollow supporting member and a compression spring on each side of said abutment and between said abutment and the adjacent sidewalls of said supporting member.